United States Patent [19]

Carlstedt

[11] Patent Number: 5,351,844
[45] Date of Patent: Oct. 4, 1994

[54] ELASTOMERIC SPRING UNIT

[75] Inventor: Richard A. Carlstedt, Wheaton, Ill.

[73] Assignee: Miner Enterprises, Inc., Geneva, Ill.

[21] Appl. No.: 69,328

[22] Filed: Jun. 1, 1993

[51] Int. Cl.$^5$ ............................................. B61G 9/00
[52] U.S. Cl. .................................. 213/44; 213/40 D; 267/141.1
[58] Field of Search .................... 213/44, 40 R, 22; 267/141.1, 153; 264/274, 249

[56] References Cited

U.S. PATENT DOCUMENTS

| | | | |
|---|---|---|---|
| 3,227,288 | 1/1966 | Mulcahy et al. | 213/22 |
| 3,293,106 | 12/1966 | Cocco et al. | 264/274 |
| 3,522,345 | 7/1970 | Olsen | 264/274 |
| 3,966,057 | 6/1976 | Duquette et al. | 213/22 |
| 4,198,037 | 4/1980 | Anderson | 267/153 |
| 4,566,678 | 1/1986 | Anderson | 267/141.1 |
| 4,769,896 | 9/1988 | Denlinger et al. | 264/249 |
| 4,822,671 | 4/1989 | Carper et al. | 264/249 |

FOREIGN PATENT DOCUMENTS

| | | | |
|---|---|---|---|
| 0591054 | 1/1960 | Canada | 213/44 |
| 2064527 | 3/1987 | Japan | 264/274 |
| 2064528 | 3/1987 | Japan | 264/274 |

Primary Examiner—Mark T. Le

[57] ABSTRACT

A compression spring formed of an elastomer having a ratio of plastic strain to elastic strain that is greater than 1.5 to 1, the elastomer having a having a projection extending through a metal plate and being cold formed into a rivet-like head to define a mechanical bond between the elastomer and the metal plate.

3 Claims, 3 Drawing Sheets

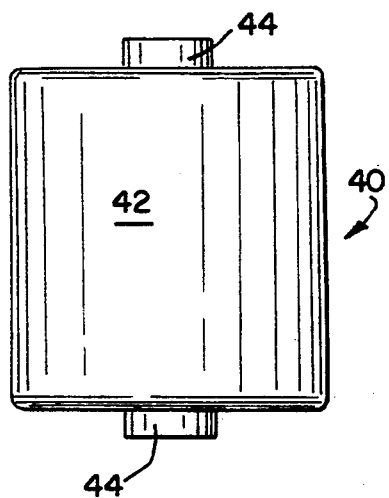
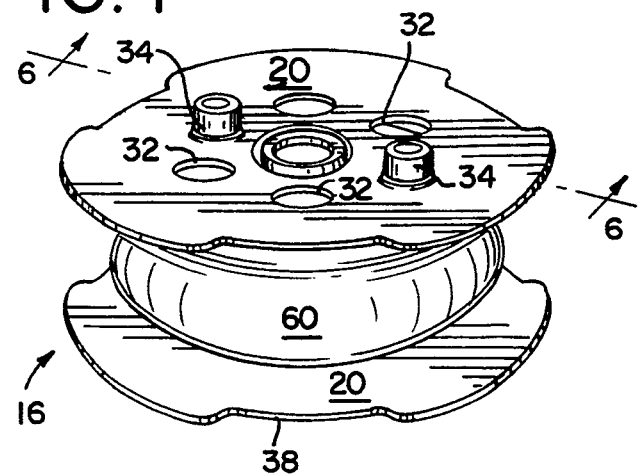
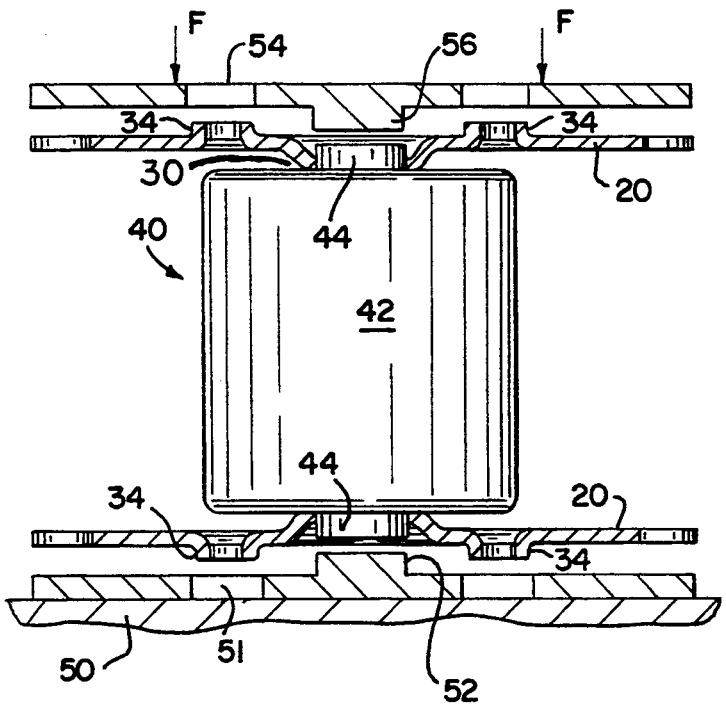
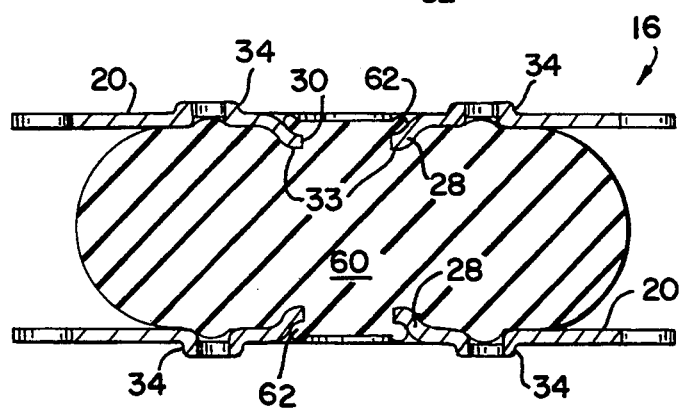

ELASTOMERIC SPRING UNIT

BACKGROUND OF INVENTION

1. Field of Invention

This invention relates, in part, to draft gears used on rail cars to absorb shock during coupling and other physical impacts between the rail cars. Such draft gears are illustrated by U.S. Pat. No. 3,227,288 which issued on Jan. 4, 1966 to Mulcahy. More particularly, the present invention relates to improvements in the compression spring components of these draft gears. Such spring components are normally formed of an elastomer pad which is joined or bonded to a metal plate. Illustrative of the related prior art spring units are those illustrated in U.S. Pat. No. 4,198,037 which issued to David O. Anderson on Apr. 15, 1980. The overall shock absorbing capacity of those spring units are affected, not only by the elastomeric pad design, but by the surface contact and bonding of the pad to the metal plates.

2. Related Art

Several alternative metal plate and elastomeric pad designs are depicted in the Anderson U.S. Pat. No. 4,198,037 identified above. Such combination designs are generally reflected in FIGS. 4 through 11. Each includes a surface incongruity in the metal plate which is intended to capture a portion of the elastomer that is forced into the incongruity by cold forming, i.e., the direct application of pressure which causes the elastomer to flow into the incongruities. The use and selection of any particular design is dependent upon the energy to be absorbed and the intended application for the spring. In large part, the design of FIGS. 5-7 of this prior Anderson patent has been the primary design used commercially by Anderson's assignee, Miner Enterprises, Inc., in its draft gears.

Another related prior patent is U.S. Pat. No. 4,566,678 which also issued to Miner Enterprises, Inc., on an application of David O. Anderson. This patent is similarly directed to an elastomeric pad formed of a thermoplastic Hytrel ® that was joined to metal plates and intended to be used in a rail car buffer unit as well as other shock absorbing applications.

SUMMARY OF INVENTION

This invention relates to an improved center-grip metal plate and its mechanical bond to an elastomeric pad to form an improved elastomeric spring unit. The preferred embodiment includes a plate with a central boss having a central opening extending therethrough, a plurality of apertures extending through the plate at a radius from the central boss and its opening, and one or more extruded projections having an opening therethrough. This preferred embodiment also includes a central projection from the elastomeric pad that extends through the central opening of the plate and is cold-headed or formed to lock the pad to the plate to define an improved elastomeric spring unit.

The elastomeric pad is formed of an elastomer whose ratio of plastic deformation to its elastic deformation is greater than 1.5 to 1. Preferably, the elastomer is a copolyester polymer elastomer such as that manufactured and sold by E.I. DuPont de Nemoirs under the trademark Hytrel ®. Generally, such elastomers, when molded are subject to a compression set and will not function as a compression spring. As noted, however, in the Anderson U.S. Pat. No. 4,198,037, such elastomers can be compressed so as to take a compression set and to orient the molecular structure of the material, and, consequently, such elastomers can thereafter serve very effectively as a compression spring unit.

As will be reflected by the following specifications and drawings, the objectives of this invention are to provide, among other things, 1) a unique center-grip metal plate of a design that can be bonded to both the top and the bottom of the elastomeric pad, thereby eliminating the prior requirement for dual designs for top and bottom plates-designs that required separate tooling, separate parts inventories and additional steps in the manufacturing process;

2) a compression spring unit in which the bonding between the pad and the center-grip plate is formed by extending a central projection of the elastomeric pad through the central opening of the metal plate and then simultaneously compressing the two units to simultaneously achieve a) a cold-formed, rivet-like interlock of the elastomer projection with the plate, and b) a pad formed of an elastomer in which the molecular structure of the elastomer has been offend and will function as a compression spring. This method of manufacture eliminates the normal two step process of first forming a spring and then bonding same to the metal plate; 3) a simple plate-elastomer pad combination in which concentric components locates the pad and plate concentrically on one another so as to eliminate special tooling or careful, costly and time consuming alignment which seldom achieves the degree of concentricity of the present invention; 4) an elastomer spring formed of an elastomer that is very durable, inert to reaction with grime, salt and corrosive fluids, not subject to tear propagation, and that has tensile characteristics such that the ratio of plastic strain to elastic strain is greater than 1.5 to 1, and when bonded to a metal plate as set forth herein, will form a more lasting, durable bond that far exceeds the needs of even the demanding rail car industry; 5) a substantially improved compression spring unit for the rail car and other applications due, in large part, to the very high degree of concentricity of the concentric spring units. This concentricity results in a reduced tendency of a plurality of pads to buckle when placed in compression-thus prolonging wear, durability and enhancing the spring characteristics of the entire unit. 6) a compression spring pad that provides substantial cost savings through the reduction of at least one part, lower inventory costs, easier assembly, manufacture and greater endurance.

DESCRIPTION OF THE DRAWINGS

The manner in which these objectives and other desirable characteristics can be obtained from this invention is explained in the following specification and attached drawings in which:

FIG. 4 is a side elevation view of a preferred embodiment of a molded preform of the elastomeric pad used in the compression spring unit of this invention;

FIG. 5 is a side elevation view of the components of the preferred embodiment of the preform, two associated metal plates and a manufacturing die arranged to illustrate the manufacturing step of the compression spring unit of this preferred embodiment;

FIG. 6 is a side elevation view, in section, of a preferred embodiment of my invention, the section being taken along the line 6—6 of FIG. 7; and FIG. 7 is a perspective view of a compression spring unit of a preferred embodiment of the invention.

DESCRIPTION OF THE PREFERRED EMBODIMENT

Figure 1:
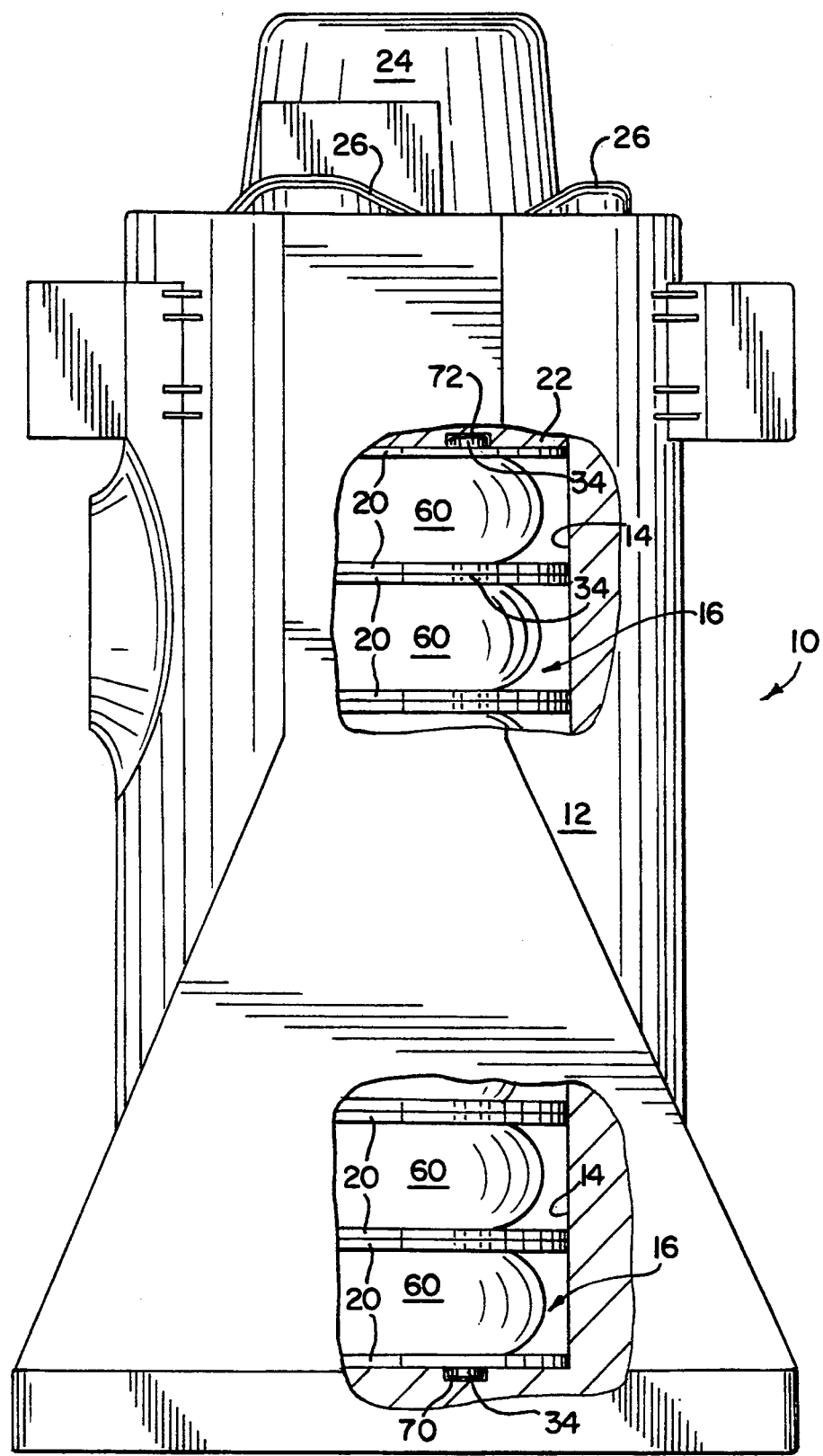
FIG. 1 is an illustrative side elevation view of a rail car draft gear with sections broken away to disclose one of the intended environments and applications for this new, compression spring unit.

The preferred embodiment of my invention is illustrated in one of several intended environments in FIG. 1. This environment is a rail car draft gear 10 which is depicted in its upright position. Such draft gears are normally mounted horizontally within a rail car housing that is arranged to convert both the tension and compression forces of the rail car coupler (not shown) to a compressive force upon the illustrated draft gear.

The draft gear 10 is formed of a main housing 12 which has a central opening 14 to define a generally hollow section (unnumbered) for receiving the compression spring units 16 of my invention. As illustrated in FIGS. 1, 6 and 7, each of these compression spring units 16 are formed of an elastomer pad 60 and a metal plate 20 affixed to the top and bottom surfaces of the pad 60.

As shown in the broken away sections of FIG. 1, the central opening 14 of the draft gear receives a plurality of the compression spring units 16, each stacked one upon the other. In part, these compression spring units 16 receive and absorb the very substantial impact forces that are imposed upon the rail cars during their movement, and, more significantly, when the cars are being coupled into train units in the switch yards.

Another portion of the energy created by the impact between rail cars is absorbed by the friction components of the draft gear. These friction components include the wedge 24 which extends from the opening 14 of the housing 12. Upon impact, this wedge 24 is forced inwardly into the central opening 14 to engage inclined surfaces of the three shoes 26. As the wedge 24 and the shoes 26 are forced inwardly of the housing 12, friction forces generated through various inclined surfaces absorb the remaining energy resulting from the impact.

A follower plate 22 is interposed between the these friction components and the compression spring units 16. The purpose of this plate 22 is to transmit a portion of the impact energy from the wedge 24 to the compression spring units. This general operation of these general components of draft gears is well known to persons skilled in the art and is further illustrated by the mentioned U.S. Pat. No. 3,227,288 of Mulcahy, et. al.

Figure 2:
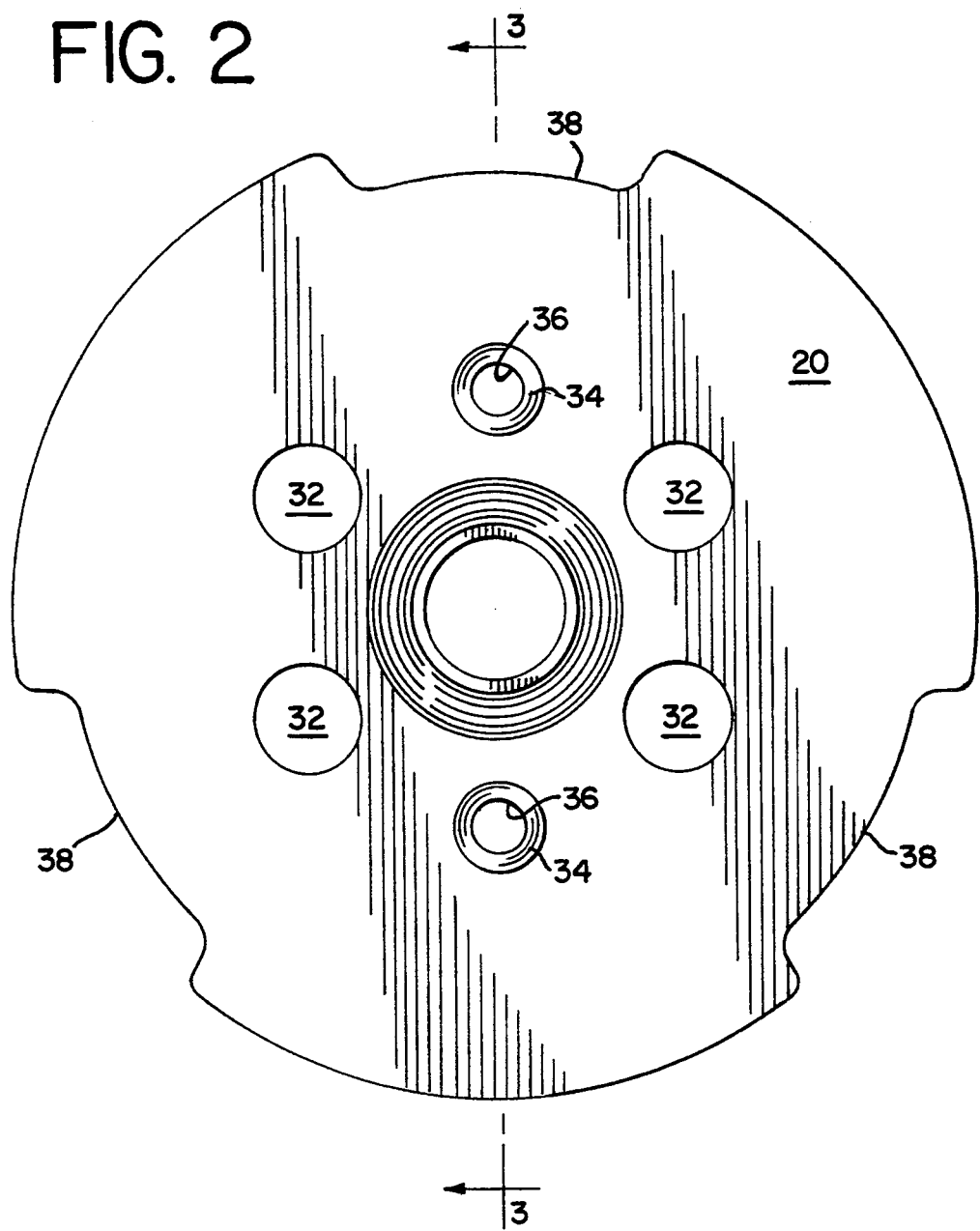
FIG. 2 is a plan view of the preferred embodiment of the metal plate of this invention.
Figure 3:
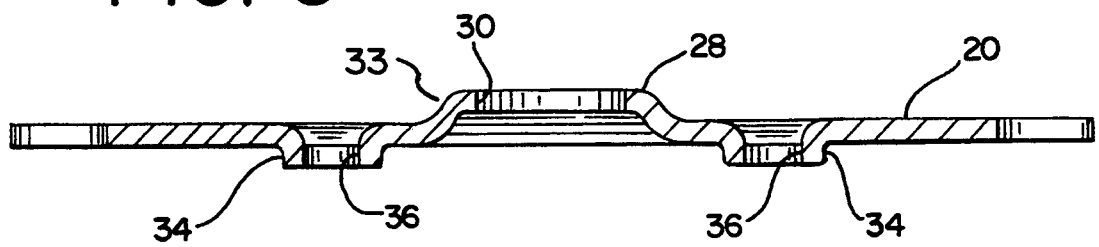
FIG. 3 is a sectional side elevation view of the metal plate of FIG. 2 taken along the lines 3—3 of FIG. 2.

To further reduce the costs, to add to the durability, reliability and the functional benefits of such draft gears, my improved spring innovation starts with the improved metal plate 20 which is best illustrated in FIGS. 2 and 3 of the drawings. These plates are generally circular so as to be received within the central opening 14 of the draft gear housing. Preferably they are formed of a low carbon, hot rolled steel per ASTM A 569 and have a minimum hardness of Rockwell 45B.

As shown in FIGS. 3 and 6, each metal plate 20 has a central boss 28 extending from the normal height of the plate inwardly into the elastomer pad 60. This boss 28 terminates in an inturned flange 33 that defines a central opening 30. As will be subsequently explained, this central opening 30 receives a projection 44 of the elastomer preform 40.

The metal plate 20 also has a plurality of apertures 32 spaced at a common distance or radius from the central boss 28. In addition, the metal plate 20 has at least one and preferably two extruded projections 34 extending outwardly from the plate 20 and associated elastomer pad 60. Preferably, these projections are two in number, have an aperture 36 extending therethrough and are positioned from the central boss 28 at the same common distance or radius of the apertures 32. In addition, the centers of the apertures 32 and the apertures 36 of projections 34 are preferably spaced at equal angles from one another upon the radius. Finally, reliefs 38 may be formed in the circumference of the plates 20 to facilitate assembly of the spring units 16 into the housing 12.

These metal plates are, preferably, formed by conventional stamping processes using dies and stamping machines such as those typically found in the tool, die, and stamping organizations. My improved elastomeric spring unit 16 also includes significant modifications to the elastomeric preform that is to form the compression spring 60. As depicted in FIG. 4, my preform 40 takes the shape of a molded cylindrical body 42 having opposed, generally flat surfaces at each end. Extending from each end of the cylindrical body 42 and concentric therewith is a projection or nipple 44.

As reflected in FIG. 5, the diameter of the projection 44 is such that it will extend snugly into the aperture 30 of the boss 28 of metal plate 20. In addition, the length of the projections 44 is such as to extend beyond the boss 28 and inturned flange 33.

As previously mentioned, the preform 40 is molded of an elastomer that is very durable, inert to reaction with grime, salt and corrosive fluids, not subject to tear propagation, has tensile characteristics such that the ratio of plastic strain to elastic strain is greater than 1.5 to 1, and when bonded to a metal plate as set forth herein, will form a more lasting, durable bond that far exceeds the needs of even the demanding rail car industry. One such elastomer is the copolyester polymer that is sold by E.I. DuPont de Nemoirs under the trademark Hytrel ®. Such elastomers are well known in the industry and are more fully described in the Anderson U.S. Pat. No. 4,198,037 as well as U.S. Pat. Nos. 3,763,109, 3,766,146 and 3,651,014. While the DuPont Company does provide this material under different composition numbers to reflect some minor variations in properties such as hardness, each will be suitable and a preference for any one of the compositions will be dependent upon the weight of the rail cars, the amount of energy to be absorbed and factors related to the intended or specific application. For the application shown in FIG. 1, Hytrel ® type 5556 is preferred and has been found to be well suited. The preform 40 of the Hytrel ® elastomer can be successfully molded by any of several techniques including melt casting, injection molding and other techniques recommended by the DuPont Company and well known to the molding industry.

After the metal plates 20 have been stamped from coil or sheet metal and after the preforms 40 have been molded, these two units are formed into a compression spring unit 16 in the manner depicted in FIG. 5. This figure reflects that the central openings 30 of the metal plates 20 have been inserted over the projections 44 of the preform. Contrary to the prior compression spring designs, this insertion insures that the metal plates 20 are concentric with the cylindrical body 42 of the preform 40.

After this assembly of the preform 40 with the plates 20, the assembly is placed in a hydraulic, mechanical or other press (not shown) having a die comprised of lower fixed die shoe or plate 50 upon which is mounted a lower die 51 having a central projection 52. The press and die also have a vertically reciprocal upper die 54 upon which is mounted a central projection 56. Significantly, the assembly is placed in the die such that the projections 44 from the preform 40 are vertically aligned with the central projections 52 and 56 of the dies. Such alignment may be done either visually or, preferably, automatically by the use of apertures, pins or other locators placed in the upper and lower dies 51 and 54.

To form the elastomeric compression spring unit 16 of my invention, a force F is then applied to the upper die 54 so as to compress the preform assembly and plates between the dies 54 and 51. Preferably, the preform is compressed by at least 30% and, preferably by more than 50% of its original height. The compressive force F is applied to the preform assembly for several seconds, and upon release, it will return to a height such as that reflected in FIG. 6.

This compression accomplishes two important functions. The first important function is that of causing the elastomer to take a permanent compression set and of orienting the molecular structure of the elastomer. As explained in the Anderson patent, the preform will take this "set" and thereafter it will act as an effective compression spring, i.e., upon subsequent applications of force the elastomer will always return to the height shown in FIG. 6. (Without such precompression, Hytrel ® will not function properly as a compression spring).

The second important function of the compression step of FIG. 5 is to cold head or cold form the nipple projection 44 over the central boss 28 and the inturned flanges 33. As reflected in FIG. 6, such cold forming has the effect of forming a rivet head 62 of the elastomer over the inturned flanges 33 to insure a permanent, fixed mechanical bond between the metal plates 20 and the elastomer pads 60. Indeed, it is my conclusion that this cold heading and riveting step forms a mechanical bond far superior to anything previously known or disclosed in the Anderson U.S. Pat. No. 4,198,037. Moreover, my innovative design of the metal plates 20 and the preform 40 achieves each of the objectives previously stated in this application. In part, it is believed that the generally flat surfaces of the ends of the preform 42, coupled with only a single, concentric, cold form interlock 62 is a substantial improvement over the prior Anderson bond. This improvement arises from the facts that 1) Anderson used plural interlocks formed at a distance from the center of the plates, 2) those interlocks were not precisely concentric to the axis of the pad and 3) his cold formed interlocks were not identical to one another. This absence of concentricity, together with the non-uniform interlocks, are believed to have resulted in a buckling and breaking of the interlock of a series of stacked pads after a period of use of the associated draft gear. The present invention and this new interlock avoids this buckling and breaking problem.

Upon compression of the preform 40 and release of the force F, the elastomeric compression spring of my invention is complete. Thereafter, the units may be stacked and inserted into the central opening 14 of the draft gear 10 or other intended application.

My design of the metal plates 20 provides further benefits to a stacked group of compression spring units 16. As noted, each unit has a plurality of apertures 32 and two projections 34 positioned at equal angles from each other at a constant distance or radius from the center of the plate 20. Consequently, the plates of one spring unit may be rotated such that the projections 34 of one plate will extend into the apertures 32 of the adjacent plates. Such provides not only a flat nesting of the adjacent plates but adds rigidity and stability to the pad stack within the central opening 14 of the draft gear 10. This stability may be further enhanced by holes 70 east into the bottom of the draft gear central opening 14 to receive the projections 34 of the bottom plate 20 (see FIG. 1), while similar holes 72 may be forged in the follower 22 to receive the projection 34 of the uppermost plate.

In as much as various rail cars and other energy systems have different weights and different desired ride or cushioning characteristics, there is no one manufacturing design for my invention which will accommodate all rail car models or all cushioning applications. Consequently, the conventional scaling and experimentation to achieve proper force absorption for different potential applications may be required by persons having ordinary skill in the art to achieve the optimum configuration for each application.

Persons skilled in the art of plastic forming and compression spring design will also appreciate that many modifications of my invention will produce satisfactory results. Elastomers other than Hytrel ® may be acceptable for some applications. In addition, the shape of the preform may be modified to achieve different spring characteristics.

The process of molding the compression spring of my invention can also include various modifications. Extrusion blow molding would yield acceptable springs. These and other variations, which will be appreciated by those skilled in the art, are within the intended scope of my invention as claimed below.

I claim:

1. An improvement in a draft gear having a housing, a friction wedge unit extending from the interior of the housing for receiving impact forces and spring units mounted within the housing adjacent said wedge unit for absorbing impact forces that may occur between rail cars, said improvement residing in at least one of said spring units comprising:
   a) a spring member formed of an elastomer having a molecular structure and a ratio of plastic strain to elastic strain that is greater than 1.5 to 1, said member having two generally flat opposed surfaces with a central projection extending from each surface;
   b) a metal plate having a boss with an inturned flange defining an aperture, said aperture receiving the central projection extending from the associated flat surface of said spring member;
   c) the molecular structure of said elastomer being oriented, and;
   d) the central projection extending through said aperture of said plate, terminating in a diameter larger than said aperture to form a mechanical interlock with said inturned flange.

2. The improvement as recited in claim 1 in which the larger diameter of the central projection forms a rivethead that defines the sole mechanical bond between each plate and the spring member.

3. The improvement as recited in claim 1 in which the mechanical interlock is concentric to the central axis of said spring and of said metal plate.

* * * * *